United States Patent
Lee

(10) Patent No.: US 12,189,891 B2
(45) Date of Patent: Jan. 7, 2025

(54) GATE DRIVING CIRCUIT AND DISPLAY DEVICE INCLUDING THE SAME

(71) Applicant: LG Display Co., Ltd., Seoul (KR)

(72) Inventor: Tae Gwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/355,196

(22) Filed: Jul. 19, 2023

(65) Prior Publication Data
US 2024/0256079 A1    Aug. 1, 2024

(30) Foreign Application Priority Data

Jan. 30, 2023    (KR) .................. 10-2023-0011717

(51) Int. Cl.
*G09G 3/20*    (2006.01)
*G06F 3/041*    (2006.01)
(Continued)

(52) U.S. Cl.
CPC ........ *G06F 3/04166* (2019.05); *G06F 3/0412* (2013.01); *G06F 3/044* (2013.01); *G09G 3/3233* (2013.01); *G09G 3/3266* (2013.01); *G09G 2300/0819* (2013.01); *G09G 2300/0842* (2013.01); *G09G 2310/0286* (2013.01);
(Continued)

(58) Field of Classification Search
CPC .... G06F 3/04166; G06F 3/0412; G06F 3/044; G09G 3/3233; G09G 3/3266; G09G 2300/0819; G09G 2300/0842; G09G 2310/0286; G09G 2310/08; G09G 2320/029; G09G 2320/045; G09G 2354/00

See application file for complete search history.

(56) References Cited

U.S. PATENT DOCUMENTS 10,638,086 B2    4/2020    Ahn et al.
11,030,958 B2    6/2021    Chang
(Continued)

FOREIGN PATENT DOCUMENTS

CN    111128061 A    5/2020
CN    111210757 A    5/2020
(Continued)

OTHER PUBLICATIONS

European Patent Office, Extended European Search Report, European Patent Application No. 23208885.6, Apr. 3, 2024, nine pages.
(Continued)

*Primary Examiner* — Md Saiful A Siddiqui
(74) *Attorney, Agent, or Firm* — Fenwick & West LLP

(57) ABSTRACT

A gate driving circuit including a driving circuit configured to charge an M node based on a selection signal externally supplied in response to receiving a first carry signal, and charge a Q node with a high voltage responsive to a reset signal and a voltage charged in the M node that corresponds to the selection signal, a node controller configured to control the Q node and a Qb node responsive to driving of the driving circuit, wherein a level of a voltage of the Qb node is opposite to a level of a voltage of the Q node, and an output circuit configured to output a second carry signal and at least one scan signal responsive to voltages at the Q node and Qb node included in the node controller.

18 Claims, 13 Drawing Sheets

(51) Int. Cl.
  *G06F 3/044* (2006.01)
  *G09G 3/3233* (2016.01)
  *G09G 3/3266* (2016.01)
  *G09G 3/36* (2006.01)
  *H03K 17/687* (2006.01)

(52) U.S. Cl.
  CPC ... *G09G 2310/08* (2013.01); *G09G 2320/029* (2013.01); *G09G 2320/045* (2013.01); *G09G 2354/00* (2013.01)

(56) References Cited

U.S. PATENT DOCUMENTS

| | | |
|---|---|---|
| 11,172,161 B2 | 11/2021 | Ahn et al. |
| 11,315,460 B1 | 4/2022 | Xue et al. |
| 11,756,465 B2 | 9/2023 | Kim et al. |
| 2016/0334923 A1* | 11/2016 | Chan .................. G09G 3/3677 |
| 2017/0123529 A1* | 5/2017 | Ho ........................ G06F 3/0416 |
| 2018/0103231 A1 | 4/2018 | Ahn et al. |
| 2019/0103049 A1* | 4/2019 | Noh .................... G09G 3/2092 |
| 2020/0135115 A1 | 4/2020 | Chang |
| 2020/0244920 A1 | 7/2020 | Ahn et al. |
| 2021/0201814 A1* | 7/2021 | Choi .................... G09G 3/3258 |
| 2022/0130307 A1 | 4/2022 | Xue et al. |
| 2022/0208059 A1 | 6/2022 | Kim et al. |
| 2023/0010366 A1 | 1/2023 | Son et al. |

FOREIGN PATENT DOCUMENTS

| | | | |
|---|---|---|---|
| CN | 113808534 A | * | 12/2021 |
| EP | 4116964 A1 | | 1/2023 |
| JP | 2018-060199 A | | 4/2018 |
| JP | 2021-012365 A | | 2/2021 |
| JP | 2022-104589 A | | 7/2022 |
| KR | 10-2017-0078978 A | | 7/2017 |
| KR | 10-2020-0049677 A | | 5/2020 |
| TW | 201523525 A | | 6/2015 |

OTHER PUBLICATIONS

The Japan Patent Office, Office Action, Japanese Patent Application No. 2023-189737, Aug. 6, 2024, six pages.
Taiwan Intellectual Property Office, Office Action, Taiwanese Patent Application No. 112143438, Sep. 3, 2024, eight pages.
The Japan Patent Office, Notice of Allowance, Japanese Patent Application No. 2023-189737, Oct. 15, 2024, six pages.

* cited by examiner

GATE DRIVING CIRCUIT AND DISPLAY DEVICE INCLUDING THE SAME

CROSS-REFERENCE TO RELATED APPLICATION

This application claims the benefit of Republic of Korea Patent Application No. 10-2023-0011717, filed on Jan. 30, 2023, which is hereby incorporated by reference in its entirety.

BACKGROUND

Field of Technology

The present disclosure relates to a gate driving circuit and a display device including the same.

Discussion of the Related Art

With the development of the information technology, the market for display devices that are media for connection between users and information is growing. Accordingly, display devices such as a light emitting display (LED), a quantum dot display (QDD), and a liquid crystal display (LCD) have been increasingly used.

The above display devices each include a display panel including sub-pixels, a driver which outputs a driving signal for driving of the display panel, and a power supply which generates power to be supplied to the display panel or the driver.

In such a display device, when sub-pixels formed in a display panel are supplied with driving signals, for example, a scan signal and a data signal, a selected one thereof may transmit light therethrough or directly emit light, thereby displaying an image.

SUMMARY

Accordingly, the present disclosure is directed to a gate driving circuit and a display device including the same that substantially obviate one or more problems due to limitations and disadvantages of the related art.

Embodiments of the present disclosure provide a gate driving circuit and a display device including the same in which a plurality of stages are selectively driven and a touch sensing operation is performed at a plurality of locations based on a multi-scan signal output from the selectively driven stages, thereby making it possible to reduce time required for touch sensing.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one embodiment, a gate driving circuit comprises: a driving circuit configured to charge an M node with a selection signal externally supplied to the driving circuit responsive to the driving circuit receiving a first carry signal, and charge a Q node with a high voltage responsive to a reset signal and a voltage charged in the M node that corresponds to the selection signal; a node controller connected to the driving circuit, the node controller configured to control the Q node and a Qb node responsive to driving of the driving circuit, wherein a level of a voltage at the Qb node is opposite to a level of a voltage at the Q node; and an output circuit connected to the node controller, the output circuit configured to output a second carry signal and at least one scan signal responsive to the voltage at the Q node and the voltage at the Qb node included in the node controller.

In one embodiment, a display device comprises: a display panel comprising a sub-pixel configured to display a portion of an image, and a touch electrode configured to sense a touch of the display panel; and a gate driving circuit comprising a plurality of stages configured to supply scan signals to the display panel, wherein a stage among the plurality of stages comprises: a driving circuit configured to charge an M node based on a selection signal externally supplied to the driving circuit responsive to receiving a carry signal received from another stage from the plurality of stages and charge a Q node with a high voltage responsive to a reset signal and a voltage charged in the M node that corresponds to the selection signal, a node controller connected to the driving circuit, the node controller configured to control the Q node and a Qb node responsive to driving of the driving circuit, wherein a level of a voltage at the Qb node is opposite to a level of a voltage at the Q node, and an output circuit connected to the node controller, the output circuit configured to output a carry signal and at least one scan signal responsive to the voltage at the Q node and the voltage at the Qb node included in the node controller, wherein at least two stages among the plurality of stages simultaneously output scan signals responsive to the selection signal during a touch sensing period during which touch of the touch electrode is sensed, the outputted scan signals generated as an on-voltage during the touch sensing period.

In one embodiment, a display device comprises: a display panel comprising a plurality of touch electrodes and a plurality of subpixels including a first subpixel and a second subpixel, the plurality of touch electrodes configured to sense a touch of the display panel during a touch sensing period of a frame period, and the plurality of subpixels configured to display an image during a display driving period of the frame period; and a gate driving circuit comprising a plurality of stages configured to output a plurality of scan signals to the plurality of subpixels, the plurality of stages including a first stage connected to the first subpixel and a second stage connected to the second subpixel, wherein during the touch sensing period the first stage is configured to output a first scan signal from the plurality of scan signals to the first subpixel to sense touch of a first location of the display panel and the second stage is configured to output a second scan signal to the second subpixel at a same time that the first stage outputs the scan first signal the first subpixel to sense touch of a second location of the display panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

A display device according to the present disclosure may be implemented as a television, a video player, a personal computer (PC), a home theater, an automotive electric device, or a smartphone, but is not limited thereto. The display device according to the present disclosure may be implemented by a light emitting display (LED), a quantum dot display (QDD), or a liquid crystal display (LCD). For convenience of description, an LED device that directly emits light based on an inorganic light emitting diode or an organic light emitting diode will hereinafter be taken as an example of the display device according to the present disclosure.

Thin film transistors to be described below may be implemented as n-type thin film transistors, p-type thin film transistors, or a combination of n-type and p-type thin film transistors. A thin film transistor is a three-electrode element including a gate, a source and a drain. The source is an electrode that supplies carriers to the transistor. In the thin film transistor, carriers start to flow from the source. The drain is an electrode through which carriers externally flow in the thin film transistor. Namely, carriers flow from the source to the drain in the thin film transistor.

In the case of a p-type thin film transistor, carriers are holes and thus a source voltage is higher than a drain voltage such that the holes flow from the source to the drain. Since holes flow from the source to the drain in the p-type thin film transistor, current flows from the source to the drain. In contrast, in the case of an n-type thin film transistor, carriers are electrons and thus a source voltage is lower than a drain voltage such that the electrons flow from the source to the drain. Since electrons flow from the source to the drain in the n-type thin film transistor, current flows from the drain to the source. However, the source and the drain of a thin film transistor may be interchanged according to voltages applied thereto. In connection therewith, in the following description, any one of the source and drain will be described as a first electrode, and the other one will be described as a second electrode.

Figure 1:
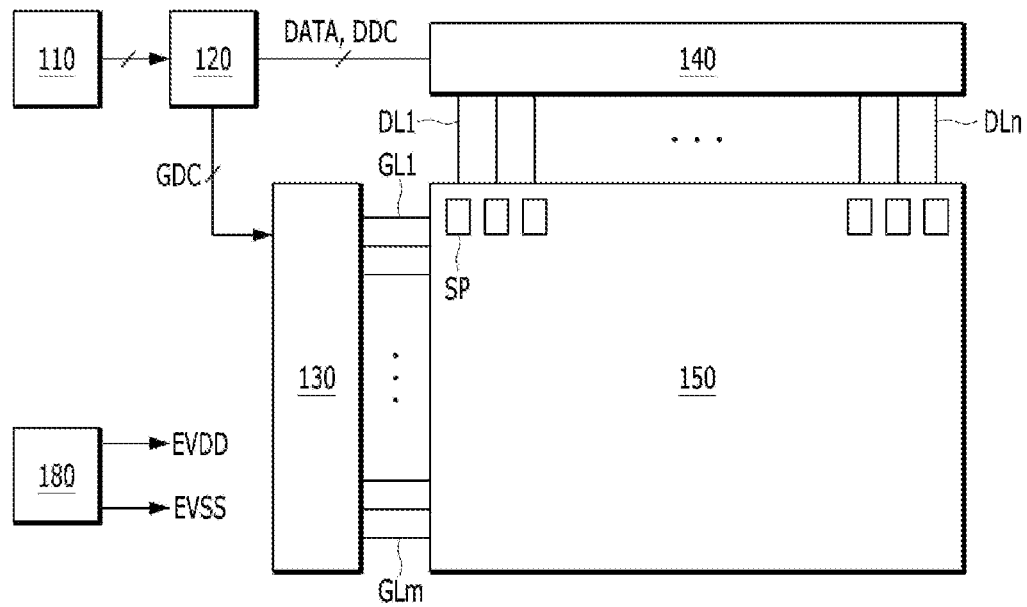
FIG. 1 is a block diagram schematically showing the configuration of a light emitting display device according to an embodiment of the present disclosure.
Figure 2:
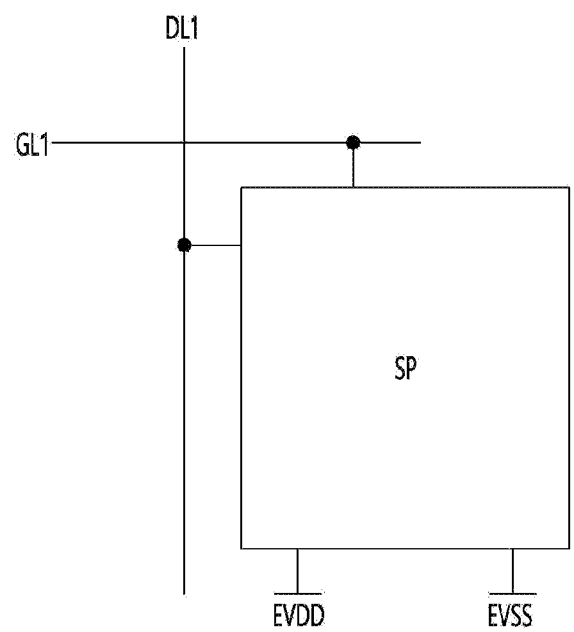
FIG. 2 is a schematic block diagram of a sub-pixel shown in FIG. 1 according to an embodiment of the present disclosure.

FIG. 1 is a block diagram schematically showing the configuration of an LED device according to an embodiment of the present application, and FIG. 2 is a schematic block diagram of a sub-pixel shown in FIG. 1 according to an embodiment of the present application.

As shown in FIGS. 1 and 2, the LED device may include an image supply 110, a timing controller 120, a gate driver (gate driving circuit) 130, a data driver (data driving circuit) 140, a display panel 150, and a power supply 180.

The image supply (set or host system) 110 may output various driving signals together with an image data signal externally supplied or an image data signal stored in an internal memory. The image supply 110 may supply the data signal and the various driving signals to the timing controller 120.

The timing controller 120 may output a gate timing control signal GDC for control of operation timing of the gate driver 130, a data timing control signal DDC for control of operation timing of the data driver 140, and various synchronization signals (a vertical synchronization signal VSYNC and a horizontal synchronization signal HSYNC). The timing controller 120 may supply a data signal DATA supplied from the image supply 110 together with the data timing control signal DDC to the data driver 140. The timing controller 120 may be formed in the form of an integrated circuit (IC) and mounted on a printed circuit board, but is not limited thereto.

The gate driver 130 may output a scan signal (or gate signal) in response to the gate timing control signal GDC supplied from the timing controller 120. The gate driver 130 may supply the scan signal to sub-pixels included in the display panel 150 through gate lines GL1 to GLm. The gate driver 130 may be formed in the form of an IC or may be formed directly on the display panel 150 in a gate-in-panel (GIP) manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply the data voltage to the sub-pixels included in the display panel 150 through data lines DL1 to DLn. The data driver 140 may be formed in the form of an IC and mounted on the display panel 150 or mounted on the printed circuit board, but is not limited thereto.

The power supply 180 may generate a high-level voltage and a low-level voltage that is less than the high-level voltage based on an external input voltage externally supplied and output the generated high-level voltage and low-level voltage through a high-level voltage line EVDD and a low-level voltage line EVSS, respectively. The power supply 180 may generate and output a voltage required to drive the gate driver 130 or a voltage required to drive the data driver 140, as well as the high-level voltage and the low-level voltage.

The display panel 150 may display an image in response to a driving signal including the scan signal and the data voltage, and a driving voltage including the high-level voltage and the low-level voltage. The sub-pixels of the display panel 150 directly emit light. The display panel 150 may be manufactured based on a rigid or flexible substrate of glass, silicon, polyimide, or the like. The sub-pixels which emit light may include pixels including red, green and blue or pixels including red, green, blue and white.

For example, one sub-pixel SP may be connected to the first data line DL1, the first gate line GL1, the high-level voltage line EVDD, and the low-level voltage line EVSS, and may include a pixel circuit which is composed of a switching transistor, a driving transistor, a capacitor, an organic light emitting diode, etc. The sub-pixel SP used in the LED device is complex in circuit configuration in that it directly emits light. Furthermore, there are various compensation circuits for compensating for deterioration of not only the organic light emitting diode, which emits light, but also the driving transistor, which supplies driving current required to drive the organic light emitting diode. In this regard, it should be noted that the sub-pixel SP is simply shown in block form.

On the other hand, in the above description, the timing controller 120, the gate driver 130, the data driver 140, etc. have been described as if they were individual components. However, one or more of the timing controller 120, the gate driver 130 and the data driver 140 may be integrated into one IC depending on how the LED device is implemented.

Figure 3:
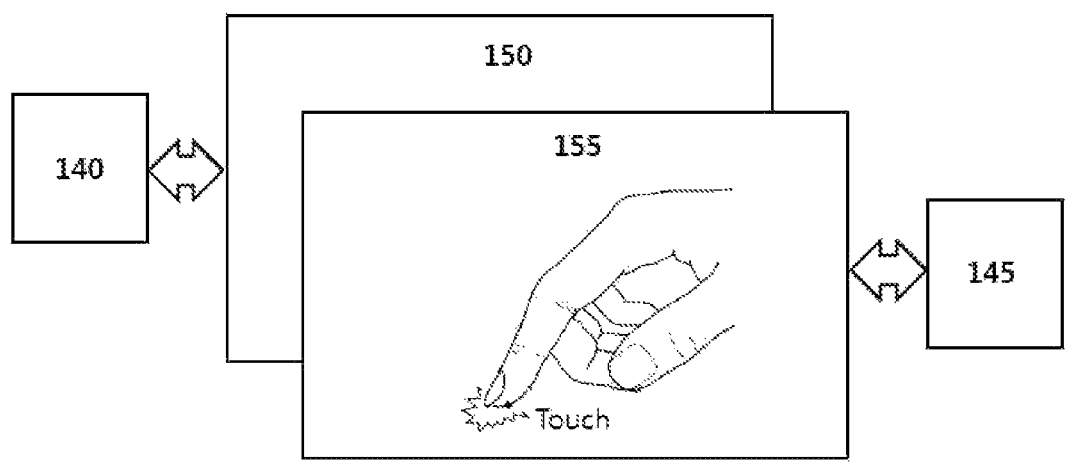
FIG. 3 is a block diagram schematically showing the configuration of a display device having a touch sensor according to an embodiment of the present disclosure.
Figure 4:
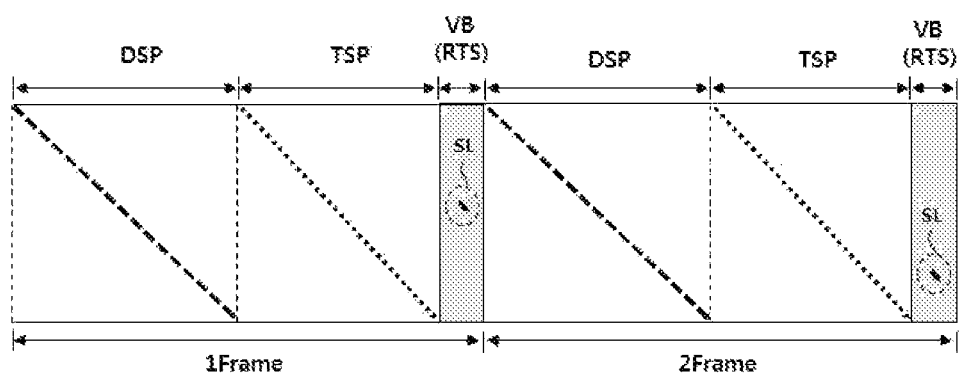
FIG. 4 is a waveform diagram schematically illustrating a driving method of the display device having the touch sensor according to an embodiment of the present disclosure.
Figure 5:
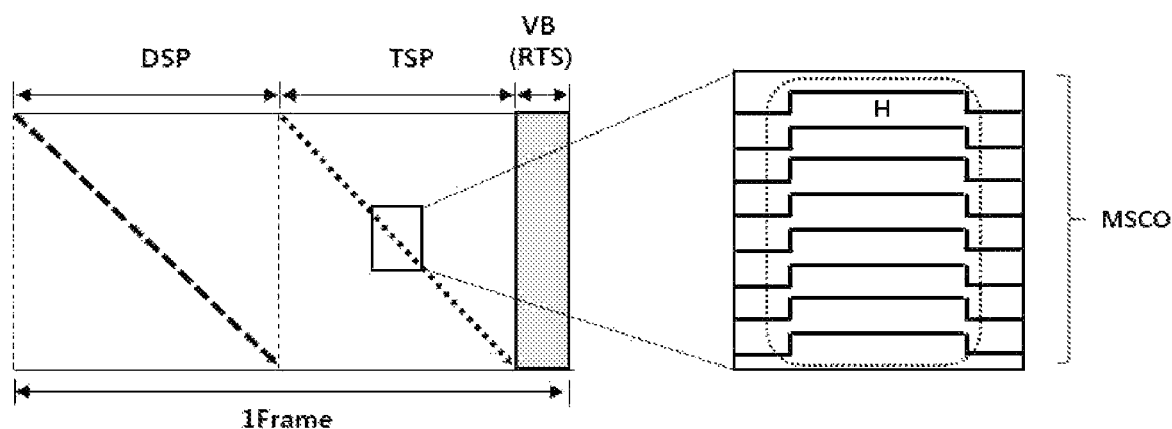
FIG. 5 is a view illustrating a scan signal output scheme for multi-sensing according to an embodiment of the present disclosure.

FIG. 3 is a block diagram schematically showing the configuration of a display device having a touch sensor according to an embodiment of the present disclosure, FIG. 4 is a waveform diagram schematically illustrating a driving method of the display device having the touch sensor according to an embodiment of the present application, and FIG. 5 is a view illustrating a scan signal output scheme for multi-sensing according to an embodiment of the present application.

As shown in FIG. 3, a display panel 150 displaying an image may have a touch sensor 155 capable of receiving a user's input in a touch manner. The touch sensor 155 may have touch electrodes for detecting presence or absence and location information of a touch on the display panel 150. The touch sensor 155 may operate in a capacitive manner.

The display panel 150 may be driven by the data driver 140 connected to a data line, and the touch sensor 155 may be driven by a touch driver 145 connected to a sensing line. The display panel 150 and the touch sensor 155 may be separately formed as separate components or may be integrated into one panel.

In the case where the display panel 150 and the touch sensor 155 are integrated into one panel, the touch sensor 155 may be separately formed on the display panel 150 or may be implemented as an electrode formed on the display panel 150. Hereinafter, a description will be given of an example in which the touch sensor 155 is implemented as an electrode formed on the display panel 150.

As shown in FIGS. 3 and 4, in the case where the touch sensor 155 is implemented as an electrode formed on the display panel 150, the display panel 150 and the touch sensor 155 may be separately controlled (driven) in a time division manner.

For example, an image display operation of the display panel 150 may be performed for a display period DSP which is a first time period of a first frame 1Frame (e.g., a frame period), and a sensing operation of the touch sensor 155 may be performed for a touch sensing period TSP which is a second time period of the first frame 1Frame. This flow may appear identically in all frames including a second frame 2Frame. Thus, each of the first frame 1Frame and second frame 2Frame (e.g., a frame period) includes a display period DSP during which an image is displayed during the frame period and a touch sensing period TSP during which touch is sensed during the frame period.

The display device according to the present embodiment may include a real-time sensing period RTS for determining whether an element included in the display panel 150, for example, a driving transistor or an organic light emitting diode has deteriorated and compensating for the deterioration.

The real-time sensing period RTS may be included in a blank period VB of a frame, not in an active period including the display period DSP and the touch sensing period TSP of the frame. Thus, a frame (e.g., the first frame 1Frame) includes a display period DSP, a touch sensing period TSP, and a real-time sensing period RTS. During the real-time sensing period RTS, a circuit associated with a sensing operation may define a specific line as a sensing line SL and sense an element included in at least one sub-pixel included in the sensing line SL.

As shown in FIG. 5, the display device according to an embodiment of the present application may output a multi-scan signal MSCO to drive and sense a plurality of touch electrodes connected to a plurality of touch electrodes during the touch sensing period TSP to determine presence or absence of a touch. The multi-scan signal MSCO may be defined as scan signals which are simultaneously generated as an on-voltage H.

On the other hand, although a high voltage is illustrated as the on-voltage H in FIG. 5, it should be understood as a voltage capable of turning on a transistor included in a sub-pixel. In this regard, the on-voltage H may be in the form of a low voltage rather than the high voltage depending on the type (for example, p-type) of the transistor. A part associated with the output of the multi-scan signal MSCO will be described below.

Figure 6:
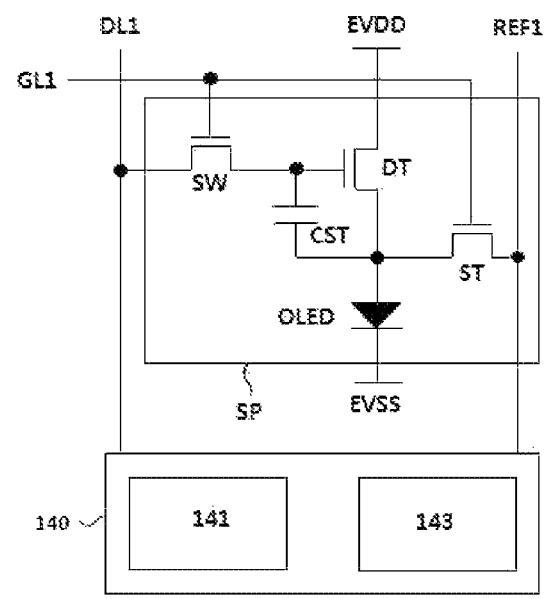
FIG. 6 is an exemplary diagram of a sub-pixel capable of real-time sensing according to an embodiment of the present disclosure.
Figure 7:
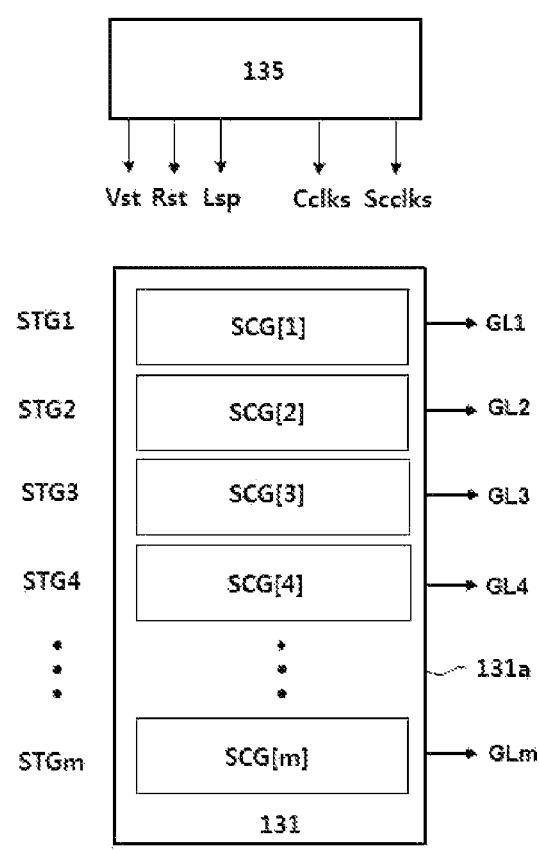
FIG. 7 is a block diagram of a gate driver capable of outputting a multi-scan signal according to an embodiment of the present disclosure.

FIG. 6 is an exemplary diagram of a sub-pixel capable of real-time sensing according to an embodiment of the present disclosure, and FIG. 7 is a block diagram of a gate driver capable of outputting a multi-scan signal according to this embodiment.

As shown in FIG. 6, the sub-pixel SP capable of real-time sensing according to the present embodiment may include a switching transistor SW, a driving transistor DT, a sensing transistor ST, a capacitor CST, and an organic light emitting diode OLED.

The driving transistor DT may have a gate electrode connected to a first electrode of the capacitor CST, a first electrode connected to a high-level voltage line EVDD, and a second electrode connected to an anode electrode of the organic light emitting diode OLED. The capacitor CST may have the first electrode connected to the gate electrode of the driving transistor DT, and a second electrode connected to the anode electrode of the organic light emitting diode OLED. The organic light emitting diode OLED may have the anode electrode connected to the second electrode of the driving transistor DT, and a cathode electrode connected to a low-level voltage line EVSS.

The switching transistor SW may have a gate electrode connected to a first gate line GL1, a first electrode connected to a first data line DL1, and a second electrode connected to the gate electrode of the driving transistor DT. The sensing transistor ST may have a gate electrode connected to the first gate line GL1, a first electrode connected to a first reference line REF1, and a second electrode connected to the anode electrode of the organic light emitting diode OLED.

The sensing transistor ST is a kind of compensation circuit which is additionally provided to compensate for deterioration (in a threshold voltage, mobility, or the like) of the driving transistor DT or organic light emitting diode OLED. The sensing transistor ST may enable physical sensing based on a source following operation of the driving transistor DT. The sensing transistor ST may operate to acquire a sensed voltage through a sensing node defined between the driving transistor DT and the organic light emitting diode OLED.

On the other hand, although the switching transistor SW and the sensing transistor ST have been shown and described in FIG. 6 as an example as being connected in common to one first gate line GL1 and turned on or off at the same time, they may be separated from each other to be connected to different gate lines, respectively.

The data driver 140 may include a panel driving circuit 141 configured to drive the sub-pixel SP, and a panel sensing circuit 143 configured to sense the sub-pixel SP. The panel driving circuit 141 may be connected to the first data line DL1, and the panel sensing circuit 143 may be connected to the first reference line REF1.

The panel driving circuit 141 may output a data voltage, etc. for driving of the sub-pixel SP through the first data line DL1 during the display period DSP of FIG. 4. The panel sensing circuit 143 may acquire a sensing voltage for sensing of the sub-pixel SP through the first reference line REF1 during the real-time sensing period RTS of FIG. 4.

The data driver 140 may transfer a sensed voltage to a timing controller, etc. The timing controller, etc. may create a compensation value corresponding to deterioration (in a threshold voltage, mobility, or the like) of the driving transistor DT or organic light emitting diode OLED based on the sensed voltage and compensate a data signal, etc. based on the compensation value.

Meanwhile, the sub-pixel SP may have a touch electrode configured based on a transistor capable of separating the anode electrode or cathode electrode of the organic light emitting diode OLED. Alternatively, a touch electrode may be configured based on a transistor capable of grouping a plurality of sub-pixels SP into one. As such, various schemes of configuring a touch electrode for implementation of a touch sensor in a display panel have been proposed, and thus parts constituting the touch electrode are not shown to prevent the embodiment from being limited to a specific touch electrode structure.

As shown in FIG. 7, the gate driver 130 capable of outputting the multi-scan signal according to the present embodiment may include a control signal output unit 135 and a shift register 131.

The control signal output unit 135 may output a start signal Vst, a reset signal Rst, a selection signal Lsp, carry clock signals Celks and scan clock signals Scclks under the control of the timing controller. The control signal output unit 135 may be included in a level shifter or a power supply depending on how a light emitting display device is implemented. In addition, at least one of the signals output from the control signal output unit 135 may be directly output from the timing controller and applied to the shift register 131.

The shift register 131 may operate based on the start signal Vst, the reset signal Rst, the selection signal Lsp, the carry clock signals Celks and the scan clock signals Scclks output from the control signal output unit 135 and output scan signals through gate lines GL1 to GLm. The shift register 131 may include stages STG1 to STGm configured to output the scan signals corresponding to the gate lines GL1 to GLm. The stages STG1 to STGm may be connected in cascade such that the front and rear ones thereof are operatively associated with each other.

The shift register 131 may be formed on a non-active area of the display panel in a gate-in-panel (GIP) manner by a thin film process which is performed during manufacture of the display panel. The shift register 131 may forwardly or backwardly output the scan signals through the gate lines GL1 to GLm of the display panel. In addition, the shift register 131 may select at least two of the gate lines GL1 to GLm and output the multi-scan signal to the selected gate lines, as will hereinafter be described.

Figure 8:
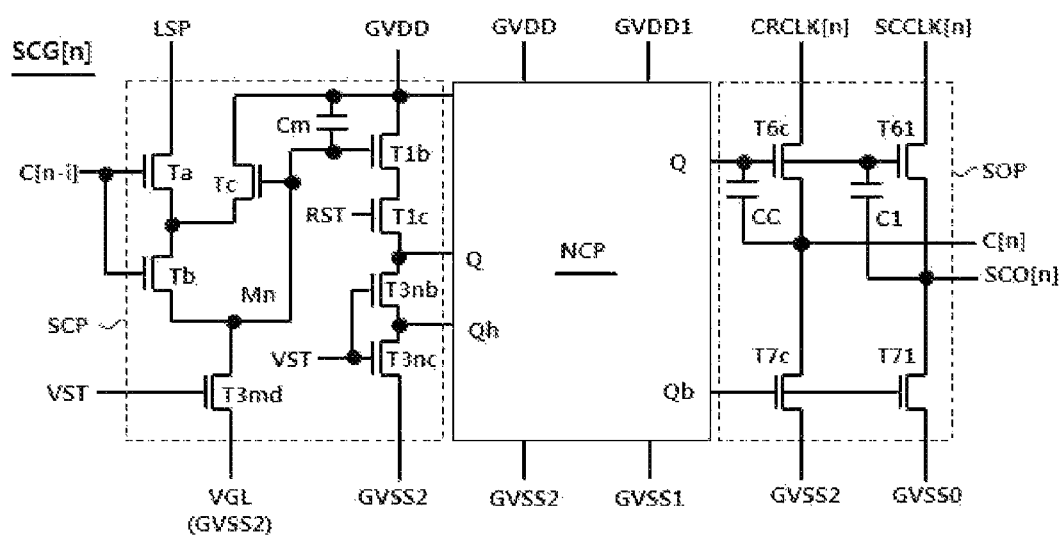
FIG. 8 is a circuit diagram showing a part of an Nth stage included in a shift register according to a first embodiment of the present disclosure.
Figure 9:
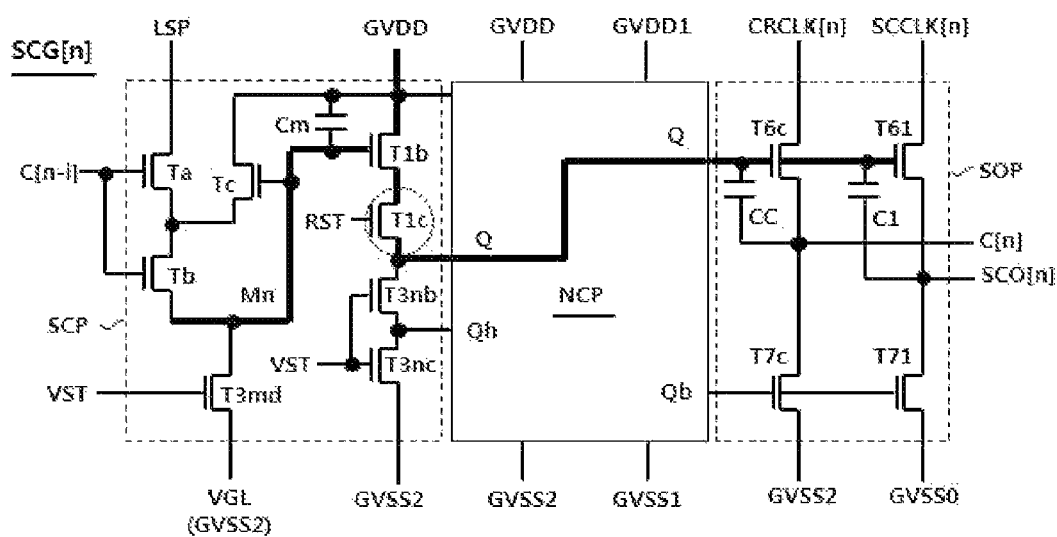
FIG. 9 is a view illustrating node states when a multi-scan signal is output from the shift register shown in FIG. 8 according to an embodiment of the present disclosure.
Figure 10:
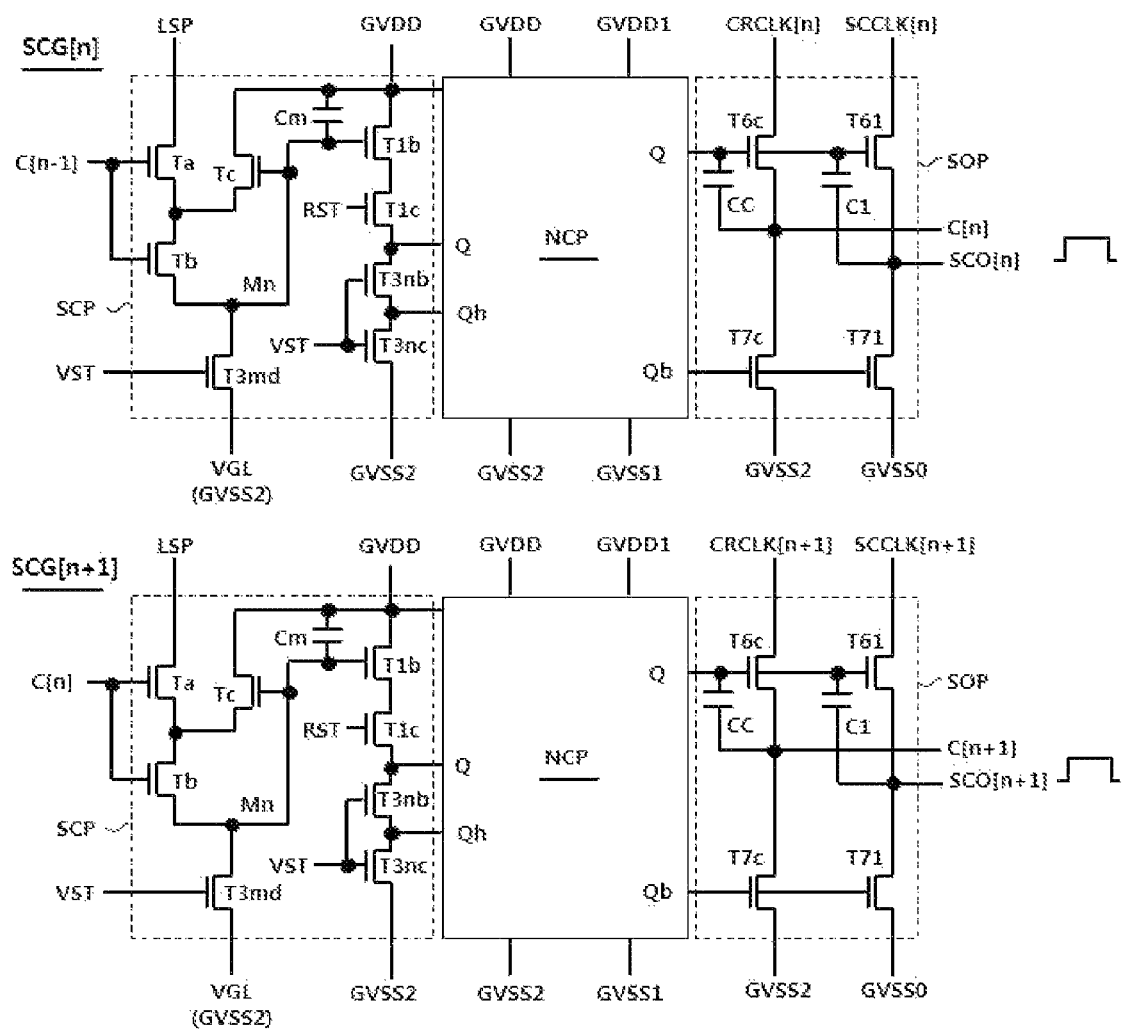
FIG. 10 is a view illustrating that the multi-scan signal is output from two stages included in the shift register according to an embodiment of the present disclosure.
Figure 11:
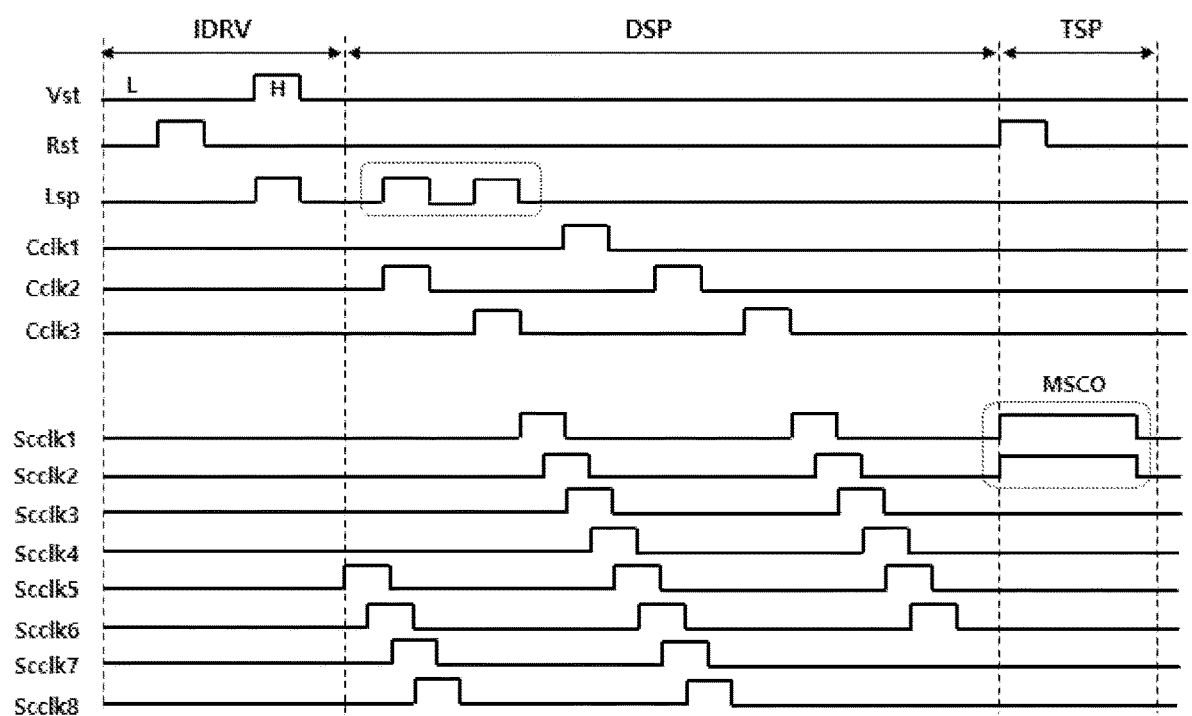
FIG. 11 is a waveform diagram illustrating a driving scheme associated with the output of the multi-scan signal from the two stages shown in FIG. 10 according to an embodiment of the present disclosure.

FIG. 8 is a circuit diagram showing a part of an Nth stage included in a shift register according to a first embodiment of the present disclosure, FIG. 9 is a view illustrating node states when a multi-scan signal is output from the shift register shown in FIG. 8 according to an embodiment of the present application, FIG. 10 is a view illustrating that the multi-scan signal is output from two stages included in the shift register according to an embodiment of the present application, and FIG. 11 is a waveform diagram illustrating a driving scheme associated with the output of the multi-scan signal from the two stages shown in FIG. 10 according to an embodiment of the present application.

As shown in FIG. 8, the Nth stage SCG[n] according to the first embodiment is a scan signal output circuit included in the shift register. The Nth stage SCG[n] may include a driving circuit SCP, a node controller NCP, and an output circuit SOP.

The driving circuit SCP may initiate the operation thereof based on a start signal input through a start signal line VST, a reset signal input through a reset signal line RST, and a selection signal input through a selection signal line LSP. The driving circuit SCP may be driven based on a first high voltage input through a first high voltage line GVDD, a gate low voltage input through a gate low line VGL (or a third low voltage line GVSS2), and a third low voltage input through the third low voltage line GVSS2 and control the node controller NCP.

The driving circuit SCP may include a first transistor Ta, a second transistor Tb, a third transistor Tc, a fourth transistor T1b, a fifth transistor T1c, a sixth transistor T3nb, a seventh transistor T3nc, an eighth transistor T3md, and a holding capacitor Cm in one embodiment.

The first transistor Ta may have a gate electrode connected to an (N−i)th carry signal output terminal C[n−i] (where i is an integer which is greater than or equal to 1) and a first electrode connected to the selection signal line LSP. The first transistor Ta may be turned on in response to an (N−i)th carry signal output through the (N−i)th carry signal output terminal C[n−i] and transfer the selection signal input through the selection signal line LSP to a second electrode of the first transistor Ta.

The second transistor Tb may have a gate electrode connected to the (N−i)th carry signal output terminal C[n−i], a first electrode connected to the second electrode of the first transistor Ta, and a second electrode connected to an M node Mn. The second transistor Tb may be turned on in response to the (N−i)th carry signal output through the (N−i)th carry signal output terminal C[n−i] and transfer the selection signal output through the second electrode of the first transistor Ta to the M node Mn.

The third transistor Tc may have a gate electrode connected to the M node Mn, a first electrode connected to the first high voltage line GVDD, and a second electrode connected to the second electrode of the first transistor Ta and the first electrode of the second transistor Tb. The third transistor Tc may be turned on in response to a voltage at the M node Mn and transfer the first high voltage input through the first high voltage line GVDD to the first electrode of the second transistor Tb.

The fourth transistor T1b may have a gate electrode connected to the M node Mn, a first electrode connected to the first high voltage line GVDD, and a second electrode connected to a first electrode of the fifth transistor T1c. The fourth transistor T1b may be turned on in response to the voltage at the M node Mn and transfer the first high voltage input through the first high voltage line GVDD to the first electrode of the fifth transistor T1c.

The fifth transistor T1c may have a gate electrode connected to the reset signal line RST, the first electrode connected to the second electrode of the fourth transistor T1b, and a second electrode connected to a Q node Q. The fifth transistor T1c may be turned on in response to the reset signal input through the reset signal line RST and transfer the first high voltage input through the second electrode of the fourth transistor T1b to the Q node Q. That is, when the fifth transistor T1c is turned on, the Q node Q may enter a charge state.

The sixth transistor T3nb may have a gate electrode connected to the start signal line VST, a first electrode connected to the Q node Q, and a second electrode connected to a first electrode of the seventh transistor T3nc. The sixth transistor T3nb may be turned on in response to the start signal input through the start signal line VST and transfer the third low voltage input through the first electrode of the seventh transistor T3nc to the Q node Q.

The seventh transistor T3nc may have a gate electrode connected to the start signal line VST, the first electrode connected to the second electrode of the sixth transistor T3nb, and a second electrode connected to the third low voltage line GVSS2. The seventh transistor T3nc may be turned on in response to the start signal input through the start signal line VST and transfer the third low voltage input through the third low voltage line GVSS2 to the second electrode of the sixth transistor T3nb. That is, when the sixth transistor T3nb and the seventh transistor T3nc are turned on at the same time, the Q node Q may enter a discharge state.

The eighth transistor T3md may have a gate electrode connected to the start signal line VST, a first electrode connected to the M node Mn, and a second electrode connected to the gate low line VGL (or the third low voltage line GVSS2). The eighth transistor T3md may be turned on in response to the start signal input through the start signal line VST and transfer the third low voltage input through the third low voltage line GVSS2 to the M node Mn. That is, when the eighth transistor T3md is turned on, the M node Mn may enter a discharge state (a discharge state for reset).

The holding capacitor Cm may have a first electrode connected to the first high voltage line GVDD, and a second electrode connected to the gate electrode of the fourth transistor T1b and the gate electrode of the third transistor Tc. The holding capacitor Cm may store the selection signal applied to the M node Mn in the form of a voltage. The holding capacitor Cm may provide a voltage capable of turning on the fourth transistor T1b for a touch sensing period.

The node controller NCP may be controlled by the driving circuit SCP to control the Q node Q, a Qh node Qh, and a Qb node Qb. The node controller NCP may charge or discharge at least one of the Q node Q, the Qh node Qh, or the Qb node Qb in response to a voltage transferred from the driving circuit SCP. On the other hand, the Q node Q and the Qb node Qb may be in opposite operation states. For example, when any one node is in a charge state, the other node may be in a discharge state.

The node controller NCP may be driven based on the first high voltage input through the first high voltage line GVDD, a second high voltage input through a second high voltage line GVDD1, a second low voltage input through a second low voltage line GVSS1, and the third low voltage input through the third low voltage line GVSS2 and control the Q node Q, the Qh node Qh, and the Qb node Qb. The node controller NCP may be implemented based on a variety of circuits, which is shown in a box shape.

The output circuit SOP may operate in response to the charge or discharge state of the Q node Q and Qb node Qb included in the node controller NCP and output a carry signal and a scan signal through a carry signal output terminal C[n] and a scan signal output terminal SCO[n], respectively. When the Q node Q is in the charge state, the output circuit SOP may output a carry clock signal input through a carry clock signal line CRCLK[n] as the carry signal of an on-voltage and output a scan clock signal input through a scan clock signal line SCCLK[n] as the scan signal of the on-voltage. When the Qb node Qb is in the charge state, the output circuit SOP may output the third low voltage input through the third low voltage line GVSS2 as the carry signal of an off-voltage and output a first low voltage input through a first low voltage line GVSS0 as the scan signal of the off-voltage.

The output circuit SOP may include a first-1 carry output transistor T6c, a first-2 carry output transistor T7c, a first carry output capacitor CC, a first-1 scan output transistor T61, a first-2 scan output transistor T71, and a first scan output capacitor C1.

The first carry output capacitor CC is a bootstrapping capacitor, which may have a first electrode connected to the Q node Q and a gate electrode of the first-1 carry output transistor T6c, and a second electrode connected to the carry signal output terminal C[n]. The first carry output capacitor CC may act to raise an output level when the carry signal of the on-voltage is output.

The first-1 carry output transistor T6c is a pull-up transistor, which may have the gate electrode connected to the Q node Q, a first electrode connected to the carry clock signal line CRCLK[n], and a second electrode connected to the carry signal output terminal C[n]. The first-1 carry output transistor T6c may be turned on in response to a voltage at the Q node Q and output the carry clock signal as the carry signal of the on-voltage.

The first-2 carry output transistor T7c is a pull-down transistor, which may have a gate electrode connected to the Qb node Qb, a first electrode connected to the carry signal output terminal C[n], and a second electrode connected to the third low voltage line GVSS2. The first-2 carry output transistor T7c may be turned on in response to a voltage at the Qb node Qb and output the third low voltage as the carry signal of the off-voltage.

The first scan output capacitor C1 is a bootstrapping capacitor, which may have a first electrode connected to the Q node Q and a gate electrode of the first-1 scan output transistor T61, and a second electrode connected to the scan signal output terminal SCO[n]. The first scan output capacitor C1 may act to raise an output level when the scan signal of the on-voltage is output.

The first-1 scan output transistor T61 is a pull-up transistor, which may have the gate electrode connected to the Q node Q, a first electrode connected to the scan clock signal line SCCLK[n], and a second electrode connected to the scan signal output terminal SCO[n]. The first-1 scan output transistor T61 may be turned on in response to the voltage at the Q node Q and output the scan clock signal as the scan signal of the on-voltage.

The first-2 scan output transistor T71 is a pull-down transistor, which may have a gate electrode connected to the Qb node Qb, a first electrode connected to the scan signal output terminal SCO[n], and a second electrode connected to the first low voltage line GVSS0. The first-2 scan output transistor T71 may be turned on in response to the voltage at the Qb node Qb and output the first low voltage as the scan signal of the off-voltage.

Meanwhile, the first high voltage and the second high voltage, described above, may have the same voltage level or may have a slight level difference therebetween. Also, the first low voltage, the second low voltage and the third low voltage, described above, may have the same voltage level or may have a slight level difference there among. Nevertheless, the reason for dividing the voltage lines is that the voltage levels may be the same or different depending on the purpose and effect.

As shown in FIG. 9, the Nth stage SCG[n] according to the first embodiment may output a multi-scan signal when the M node Mn and the Q node Q are charged for the touch sensing period TSP of FIG. 4. The multi-scan signal are scan signals simultaneously output from a plurality of stages, not one stage according to one embodiment.

As shown in FIG. 10, according to the first embodiment, the Nth stage SCG[n] and an (N+1)th stage SCG[n+1] may be configured based on the same circuit, but may have a difference in connection relationship of signal lines as will be described below.

In the Nth stage SCG[n], the gate electrodes of the first transistor Ta and second transistor Tb may be connected to a carry signal output terminal C[n−1] of an (N−1)th stage, which is a previous stage. In the Nth stage SCG[n], the first electrode of the first-1 carry output transistor T6c may be connected to the Nth carry clock signal line CRCLK[n], and the first electrode of the first-1 scan output transistor T61 may be connected to the Nth scan clock signal line SCCLK[n].

In the (N+1)th stage SCG[n+1], the gate electrodes of the first transistor Ta and second transistor Tb may be connected to the carry signal output terminal C[n] of the Nth stage, which is a previous stage. In the (N+1)th stage SCG[n+1], the first electrode of the first-1 carry output transistor Toc may be connected to an (N+1)th carry clock signal line CRCLK[n+1], and the first electrode of the first-1 scan output transistor T61 may be connected to an (N+1)th scan clock signal line SCCLK[n+1].

As shown in FIGS. 10 and 11, according to the first embodiment, the Nth stage SCG[n] and the (N+1)th stage SCG[n+1] may be reset in response to a reset signal Rst of the on-voltage H applied for an initial driving period IDRV. Then, the Nth stage SCG[n] and the (N+1)th stage SCG[n+1] may initiate driving thereof in response to a start signal Vst and a selection signal Lsp of the on-voltage H applied for the initial driving period IDRV.

Next, the Nth stage SCG[n] and the (N+1)th stage SCG[n+1] may output carry signals and scan signals in response to selection signals Lsp, carry clock signals Celk1 to Cclk3 and scan clock signals Scclk1 to Scclk8 of the on-voltage H applied for a display period DSP.

Next, for the touch sensing period TSP, the Nth stage SCG[n] and the (N+1)th stage SCG[n+1] may be reset in response to the reset signal Rst, and the M nodes Mn and Q nodes Q thereof may be charged by the selection signals Lsp applied during the display period DSP. In this manner, a plurality of stages may be driven to output a multi-scan signal MSCO. In this case, the total number of drivable stages may correspond to the total number of times the selection signals Lsp are output during the display period DSP. For example, in the case where two selection signals Lsp are applied during the display period DSP as shown in FIG. 11, the number of stages which can be driven simultaneously to output scan signals that collectively form the multi-scan signal MSCO may be two.

As a result, a touch sensor formed on a display panel may perform a touch sensing operation for sensing presence or absence of a touch at a plurality of locations in response to the multi-scan signal MSCO output from the Nth stage SCG[n] and (N+1)th stage SCG[n+1]. For example, a first location and a second location may be sensed for touch during the touch sensing period TSP in response to the scan signals output by the Nth stage SCG[n] and (N+1)th stage SCG[n+1] that collectively form the multi-scan signal MSCO.

Figure 12:
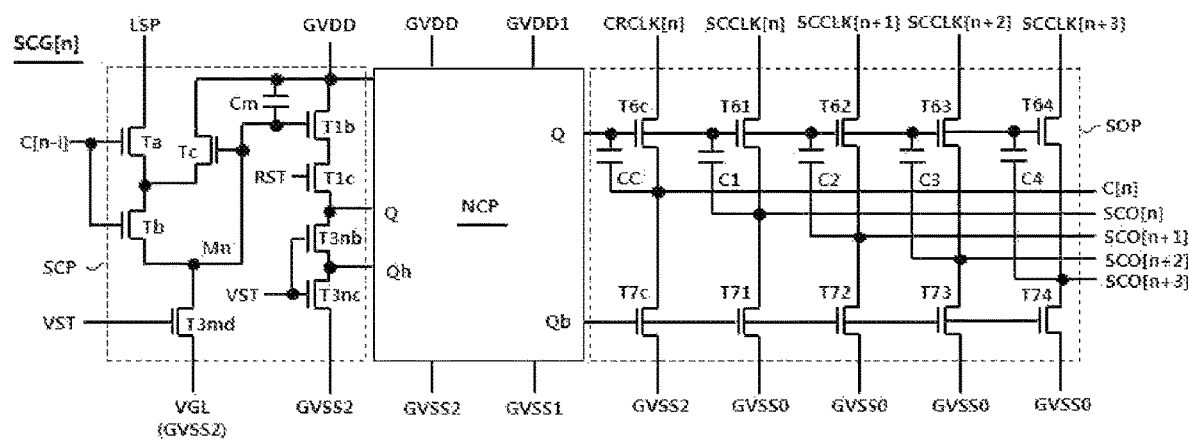
FIG. 12 is a circuit diagram showing a part of an Nth stage included in a shift register according to a second embodiment of the present disclosure.
Figure 13:
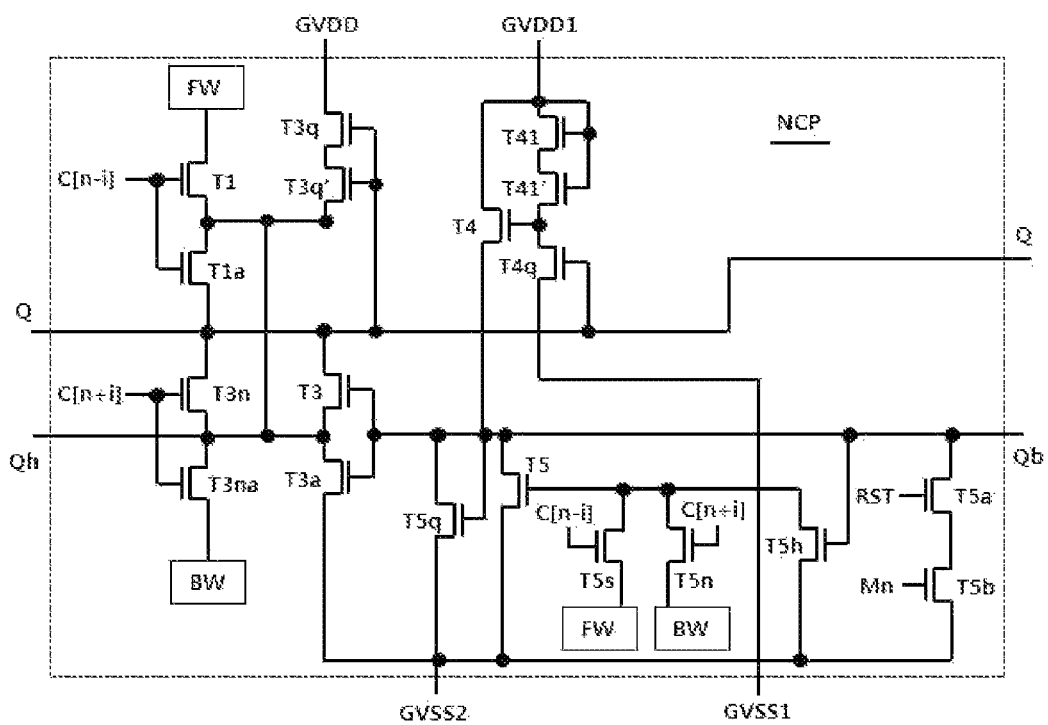
FIG. 13 is an exemplary diagram of the circuit configuration of a node controller shown in FIG. 12 according to an embodiment of the present disclosure.
Figure 14:
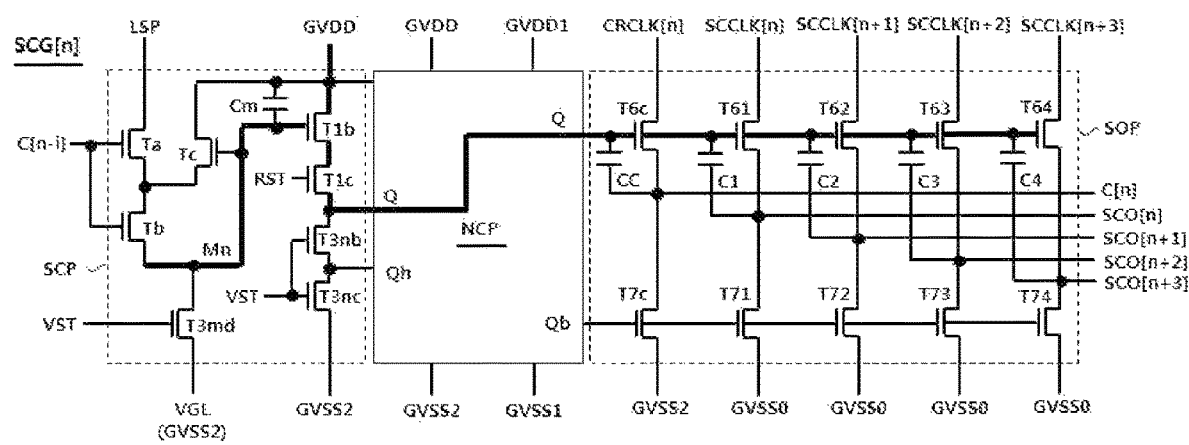
FIG. 14 is a view illustrating node states when a multi-scan signal is output from the shift register shown in FIG. 12 according to an embodiment of the present disclosure.
Figure 15:
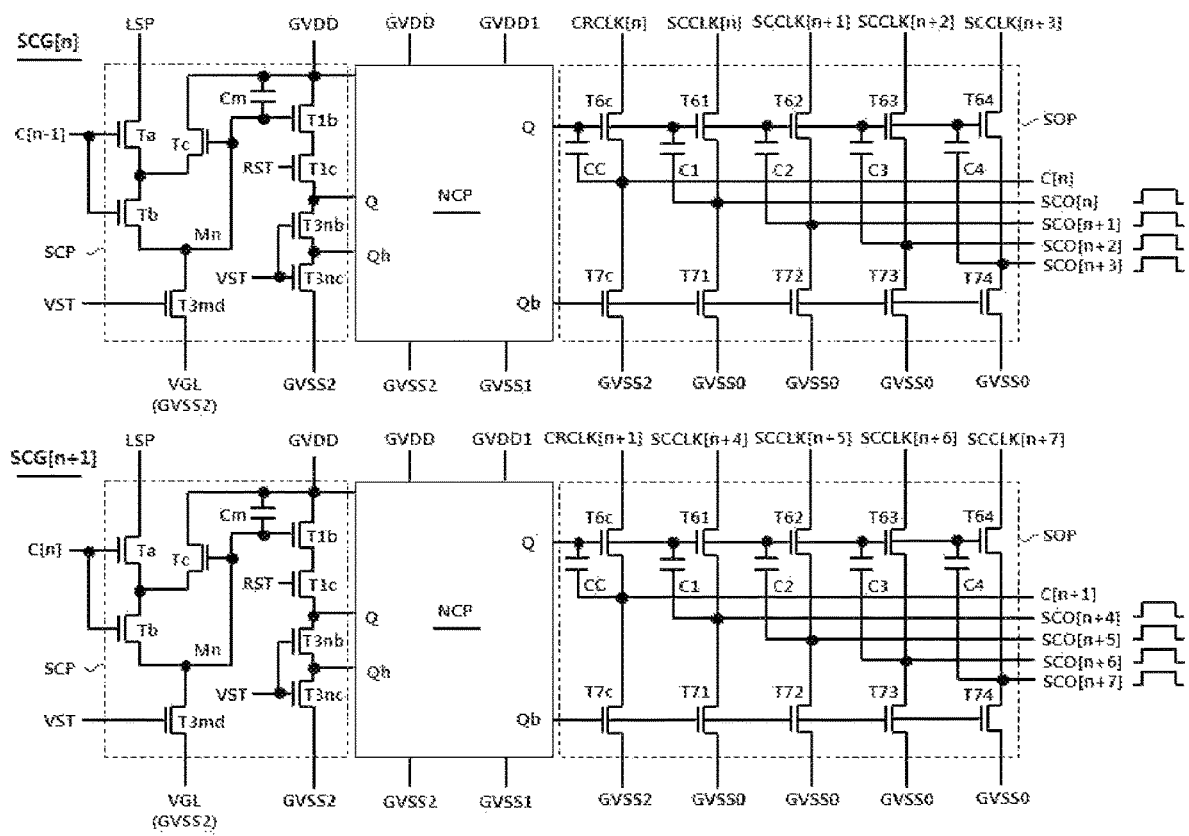
FIG. 15 is a view illustrating that the multi-scan signal is output from two stages included in the shift register according to an embodiment of the present disclosure.
Figure 16:
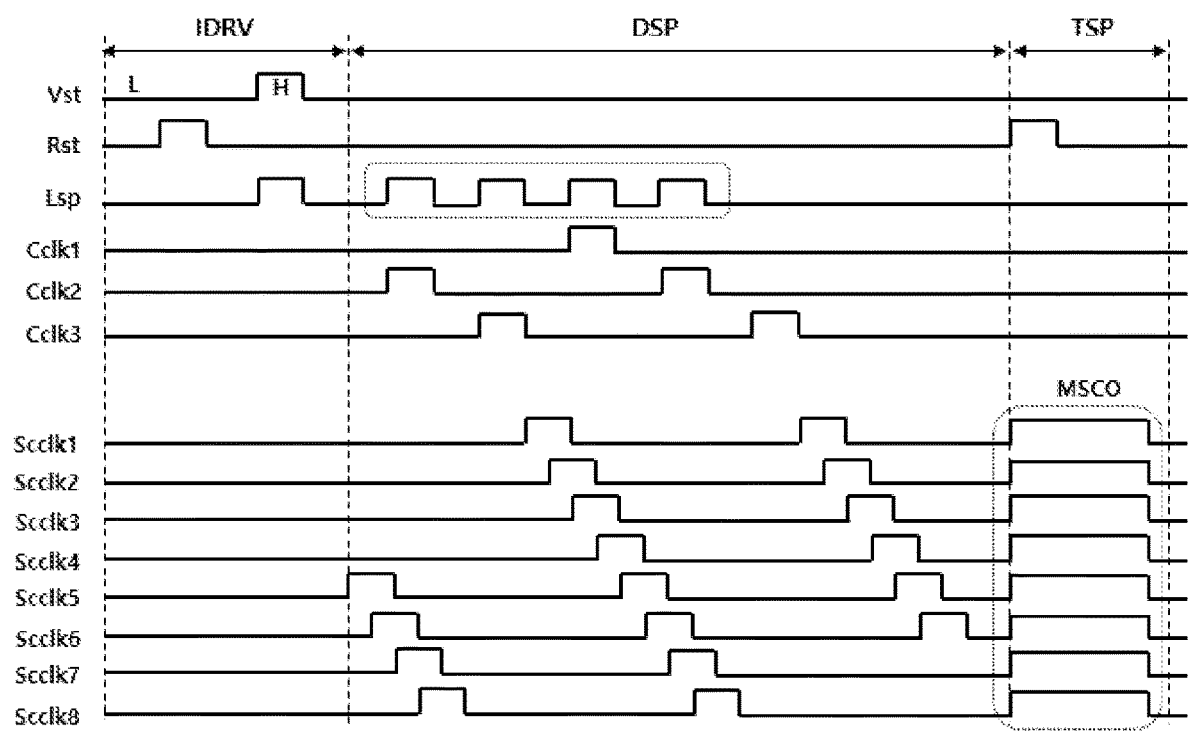
FIG. 16 is a waveform diagram illustrating a driving scheme associated with the output of the multi-scan signal from the two stages shown in FIG. 15 according to an embodiment of the present disclosure.

FIG. 12 is a circuit diagram showing a part of an Nth stage included in a shift register according to a second embodiment of the present disclosure, FIG. 13 is an exemplary diagram of the circuit configuration of a node controller shown in FIG. 12 according to the second embodiment of the present disclosure, FIG. 14 is a view illustrating node states when a multi-scan signal is output from the shift register shown in FIG. 12 according to the second embodiment of the present disclosure, FIG. 15 is a view illustrating that the multi-scan signal is output from two stages included in the shift register according to the second embodiment of the present disclosure, and FIG. 16 is a waveform diagram illustrating a driving scheme associated with the output of the multi-scan signal from the two stages shown in FIG. 15 according to the second embodiment of the present disclosure.

As shown in FIG. 12, the Nth stage SCG[n] according to the second embodiment is a scan signal output circuit included in the shift register. The Nth stage SCG[n] may include a driving circuit SCP, a node controller NCP, and an output circuit SOP. The Nth stage SCG[n] according to the second embodiment has a difference in configuration of the node controller NCP and output circuit SOP compared to the first embodiment, which will hereinafter be described.

In order to output a total of four scan signals, the output circuit SOP of the Nth stage SCG[n] according to the second embodiment may further include a first-1 scan output transistor T61, a first-2 scan output transistor T71, a first scan output capacitor C1, a second-1 scan output transistor T62, a second-2 scan output transistor T72, a second scan output capacitor C2, a third-1 scan output transistor T63, a third-2 scan output transistor T73, a third scan output capacitor C3, a fourth-1 scan output transistor T64, a fourth-2 scan output transistor T74, and a fourth scan output capacitor C4.

The first-1 scan output transistor T61, the first-2 scan output transistor T71 and the first scan output capacitor C1 may output an Nth scan signal (first scan signal) through an Nth scan signal output terminal SCO[n]. The second-1 scan output transistor T62, the second-2 scan output transistor T72 and the second scan output capacitor C2 may output an (N+1)th scan signal (second scan signal) through an (N+1)th scan signal output terminal SCO[n+1]. The third-1 scan output transistor T63, the third-2 scan output transistor T73 and the third scan output capacitor C3 may output an (N+2)th scan signal (third scan signal) through an (N+2)th scan signal output terminal SCO[n+2]. The fourth-1 scan output transistor T64, the fourth-2 scan output transistor T74 and the fourth scan output capacitor C4 may output an (N+3)th scan signal (fourth scan signal) through an (N+3)th scan signal output terminal SCO[n+3].

As shown in FIG. 13, the node controller NCP of the Nth stage SCG[n] according to the second embodiment may include a first node control transistor T1, a second node control transistor T1a, a third node control transistor T3q, a fourth node control transistor T3q', a fifth node control transistor T3n, a sixth node control transistor T3na, a seventh node control transistor T3, an eighth node control transistor T3a, a ninth node control transistor T4, a tenth node control transistor T41, an eleventh node control transistor T41', a twelfth node control transistor T4q, a thirteenth node control transistor T5q, a fourteenth node control transistor T5, a fifteenth node control transistor T5s, a sixteenth node control transistor T5n, a seventeenth node control transistor T5h, an eighteenth node control transistor T5a, and a nineteenth node control transistor T5b.

The first node control transistor T1 and the second node control transistor T1a may be turned on in response to an (N−i)th carry signal output through an (N−i)th carry signal output terminal C[n−i] (where i is an integer which is greater than or equal to 1) and control a Q node Q based on a forward signal input through a forward terminal FW.

The third node control transistor T3q and the fourth node control transistor T3q' may be turned on in response to a voltage at the Q node Q and control a Qh node Qh based on a first high voltage input through a first high voltage line GVDD.

The fifth node control transistor T3n and the sixth node control transistor T3na may be turned on in response to an (N+i)th carry signal output through an (N+i)th carry signal output terminal C[n+i] (where i is an integer which is greater than or equal to 1) and control the Q node Q and the Qh node Qh based on a backward signal input through a backward terminal BW.

The seventh node control transistor T3 and the eighth node control transistor T3a may be turned on in response to a voltage at a Qb node Qb and control the Q node Q and the Qh node Qh based on a third low voltage input through a third low voltage line GVSS2.

The ninth node control transistor T4, the tenth node control transistor T41, the eleventh node control transistor T41' and the twelfth node control transistor T4q may be turned on in response to the voltage at the Q node Q and control the thirteenth node control transistor T5q based on a second high voltage input through a second high voltage line GVDD1. When the thirteenth node control transistor T5q is turned on, the Qb node Qb may be discharged based on the third low voltage input through the third low voltage line GVSS2.

The fourteenth node control transistor T5 may be turned on in response to the forward signal transferred from the fifteenth node control transistor T5s or the backward signal transferred from the sixteenth node control transistor T5n and discharge the Qb node Qb based on the third low voltage input through the third low voltage line GVSS2.

The fifteenth node control transistor T5s may be turned on in response to the (N−i)th carry signal transferred from the (N−i)th carry signal output terminal C[n−i] (where i is an integer which is greater than or equal to 1) and transfer the forward signal input through the forward terminal FW to a gate electrode of the fourteenth node control transistor T5 and a first electrode of the seventeenth node control transistor T5h.

The sixteenth node control transistor T5n may be turned on in response to the (N+i)th carry signal transferred from the (N+i)th carry signal output terminal C[n+i] (where i is an integer which is greater than or equal to 1) and transfer the backward signal input through the backward terminal BW to the gate electrode of the fourteenth node control transistor T5 and the first electrode of the seventeenth node control transistor T5h.

The seventeenth node control transistor T5h may be turned on in response to the voltage at the Qb node Qb and discharge the Qb node Qb based on the third low voltage input through the third low voltage line GVSS2.

The eighteenth node control transistor T5a may be turned on in response to a reset signal input through a reset signal line RST and discharge the Qb node Qb based on the third low voltage transferred from the nineteenth node control transistor T5b.

The nineteenth node control transistor T5b may be turned on based on a voltage at an M node Mn and transfer the third low voltage input through the third low voltage line GVSS2 to a second electrode of the eighteenth node control transistor T5a.

As shown in FIG. 14, the Nth stage SCG[n] according to the second embodiment may output a multi-scan signal when the M node Mn and the Q node Q are charged for the touch sensing period TSP of FIG. 4. The multi-scan signal may mean scan signals output from a plurality of stages, not one stage.

As shown in FIG. 15, according to the second embodiment, the Nth stage SCG[n] and an (N+1)th stage SCG[n+1] may be configured based on the same circuit, but may have a difference in connection relationship of signal lines as will be described below.

In the Nth stage SCG[n], the gate electrodes of the first transistor Ta and second transistor Tb may be connected to a carry signal output terminal C[n−1] of an (N−1)th stage, which is a previous stage. In the Nth stage SCG[n], the first electrode of the first-1 carry output transistor T6c may be connected to the Nth carry clock signal line CRCLK[n]. In the Nth stage SCG[n], a first electrode of the first-1 scan output transistor T61 may be connected to an Nth scan clock signal line SCCLK[n], a first electrode of the second-1 scan output transistor T62 may be connected to an (N+1)th scan clock signal line SCCLK[n+1], a first electrode of the third-1 scan output transistor T63 may be connected to an (N+2)th scan clock signal line SCCLK[n+2], and a first electrode of the fourth-1 scan output transistor T64 may be connected to an (N+3)th scan clock signal line SCCLK[n+3].

In the (N+1)th stage SCG[n+1], the gate electrodes of the first transistor Ta and second transistor Tb may be connected to the carry signal output terminal C[n] of the Nth stage, which is a previous stage. In the (N+1)th stage SCG[n+1], the first electrode of the first-1 carry output transistor T6c may be connected to an (N+1)th carry clock signal line CRCLK[n+1]. In the (N+1)th stage SCG[n+1], the first electrode of the first-1 scan output transistor T61 may be connected to an (N+4)th scan clock signal line SCCLK[n+4], the first electrode of the second-1 scan output transistor T62 may be connected to an (N+5)th scan clock signal line SCCLK[n+5], the first electrode of the third-1 scan output transistor T63 may be connected to an (N+6)th scan clock signal line SCCLK[n+6], and the first electrode of the fourth-1 scan output transistor T64 may be connected to an (N+7)th scan clock signal line SCCLK[n+7].

As shown in FIGS. 15 and 16, according to the second embodiment, the Nth stage SCG[n] and the (N+1)th stage SCG[n+1] may be reset in response to a reset signal Rst of the on-voltage H applied for an initial driving period IDRV. Then, the Nth stage SCG[n] and the (N+1)th stage SCG[n+1] may initiate driving thereof in response to a start signal Vst and a selection signal Lsp of the on-voltage H applied for the initial driving period IDRV.

Next, the Nth stage SCG[n] and the (N+1)th stage SCG[n+1] may output carry signals and scan signals in response to selection signals Lsp, carry clock signals Celk1 to Celk3 and scan clock signals Scclk1 to Scclk8 of the on-voltage H applied for a display period DSP.

Next, for the touch sensing period TSP, the Nth stage SCG[n] and the (N+1)th stage SCG[n+1] may be reset in response to the reset signal Rst, and the M nodes Mn and Q nodes Q thereof may be charged by the selection signals Lsp applied during the display period DSP. In this manner, a plurality of stages may be driven to output a multi-scan signal MSCO. In this case, the total number of drivable stages may correspond to the total number of times the selection signals Lsp are output during the display period DSP. For example, in the case where four selection signals Lsp are applied during the display period DSP as shown in FIG. 16, the number of stages which can be driven simultaneously to output scan signal that collectively form the multi-scan signal MSCO may be four.

As a result, a touch sensor formed on a display panel may perform a touch sensing operation for sensing presence or absence of a touch at a plurality of locations in response to the multi-scan signal MSCO output from the Nth stage SCG[n] and (N+1)th stage SCG[n+1].

As is apparent from the above description, according to the present disclosure, a plurality of stages are selectively driven and a touch sensing operation is performed at a plurality of locations based on a multi-scan signal output from the selectively driven stages, thereby making it possible to reduce time required for touch sensing. Furthermore, embodiments of the present disclosure provide a gate driving circuit capable of selectively driving a plurality of stages based on a selection signal, and a display device capable of image display, touch sensing, and real-time sensing based on the gate driving circuit.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A gate driving circuit comprising:
a plurality of stages configured to output scan signals, and wherein at least two stages among the plurality of stages simultaneously output the scan signals,
wherein the plurality of stages including a first stage and a second stage, and
wherein the first stage comprises:
a first driving circuit configured to charge a M node of the first driving circuit based on a selection signal externally supplied to the first driving circuit responsive receiving a carry signal from another stage from the plurality of stages, and charge a Q node of the first stage with a high voltage responsive to a reset signal and a voltage charged in the M node of the first driving circuit that that corresponds to the selection signal;
a first node controller connected to the first driving circuit, the first node controller configured to control the Q node and a Qb node of the first node controller responsive to driving of the first driving circuit, wherein a level of a voltage of the Qb node is opposite to a level of a voltage at the Q node of the first node controller; and
a first output circuit connected to the first node controller, the first output circuit configured to output a first scan signal to a first subpixel and a first carry signal responsive to the voltage at the Q node and the voltage at the Qb node included in the first node controller,
wherein the second stage comprises:
a second driving circuit configured to charge a M node of the second driving circuit based on the selection signal externally supplied to the second driving circuit responsive to the first carry signal received from the first stage, and charge a Q node of the second stage with the high voltage responsive to the reset signal and a voltage charged in the M node of the second driving circuit that corresponds to the selection signal;
a second node controller connected to the second driving circuit, the second node controller configured to control the Q node and a Qb node of the second node controller responsive to driving of the second driving circuit, wherein a level of a voltage of the Qb node of the second node controller is opposite to a level of a voltage of the Q node of the second node controller; and
a second output circuit connected to the second node controller, the second output circuit configured to output a second scan signal to a second subpixel and a second carry signal responsive to the voltage at the Q node and the voltage at the Ob node included in the second node controller,
wherein the first output circuit outputs the first scan signal to the first subpixel at a same time that the second output circuit outputs the second scan signal to the second subpixel.

2. The gate driving circuit according to claim 1, wherein at least one of the first driving circuit and the second driving circuit comprises:
a first transistor, a second transistor, and a third transistor configured to charge the M node with the voltage corresponding to the selection signal responsive to the received first carry signal, and
a holding capacitor configured to store the selection signal as a voltage.

3. The gate driving circuit according to claim 2, wherein:
the first transistor comprises a gate electrode connected to a carry signal output terminal of another gate driving circuit that outputs the first carry signal received by the driving circuit, a first electrode is connected to a selection signal line that supplies the selection signal, and a second electrode, the second transistor comprises a gate electrode connected to the carry signal output terminal of the other gate driving circuit that outputs the first carry signal received by the first driving circuit or the second driving circuit, a first electrode connected to the second electrode of the first transistor, and a second electrode connected to the M node, the third transistor comprises a gate electrode connected to the second electrode of the second transistor at the M node, a first electrode connected to a high voltage line that supplies the high voltage, and a second electrode connected to the second electrode of the first transistor and the first electrode of the second transistor, and the holding capacitor comprises a first electrode and a second electrode, the first electrode connected to the high voltage line and the first electrode of the third transistor, and the second electrode connected to the gate electrode of the third transistor and the second electrode of the second transistor at the M node.

4. The gate driving circuit according to claim 3, wherein at least one of the first driving circuit and the second driving circuit further comprises:

a fourth transistor comprising a gate electrode connected to the second electrode of the holding capacitor, the gate electrode of the third transistor, and the second electrode of the second transistor at the M node, a first electrode connected to the high voltage line, the first electrode of the holding capacitor, and the first electrode of the third transistor, and a second electrode, and a fifth transistor having a gate electrode connected to a reset signal line that supplies the reset signal, a first electrode connected to the second electrode of the fourth transistor, and a second electrode that is connected to the Q node.

5. The gate driving circuit according to claim 4, wherein at least one of the first driving circuit and the second driving circuit further comprises a sixth transistor comprising a gate electrode that is connected to a start signal line that supplies a start signal, a first electrode that is connected to the second electrode of the second transistor, the gate electrode of the third transistor, the second electrode of the holding capacitor, and the gate electrode of fourth transistor at the M node, and a second electrode connected to a low voltage line that supplies a low voltage that is less than the high voltage, the sixth transistor configured to discharge the M node responsive to the start signal.

6. The gate driving circuit according to claim 1, wherein at least one of the first output circuit and the second output circuit comprises scan signal output terminals configured to simultaneously output scan signals generated as an on-voltage responsive to the voltage at the Q node.

7. A display device comprising:

a display panel comprising a plurality of subpixels configured to display a portion of an image, and a touch electrode configured to sense a touch of the display panel; and a gate driving circuit comprising a plurality of stages configured to supply scan signals to the display panel, wherein at least two stages among the plurality of stages simultaneously output scan signals responsive to a selection signal during a touch sensing period during which touch of the touch electrode is sensed, the outputted scan signals generated as an on-voltage during the touch sensing period, and wherein the plurality of stages including a first stage connected to a first subpixel and a second stage connected to a second subpixel, wherein the first stage comprises:

a first driving circuit configured to charge a M node of the first driving circuit based on a selection signal externally supplied to the first driving circuit responsive to receiving a carry signal from another stage from the plurality of stages, and charge a Q node of the first stage with a high voltage responsive to a reset signal and a voltage charged in the M node of the first driving circuit that corresponds to the selection signal;

a first node controller connected to the first driving circuit, the first node controller configured to control the Q node and a Qb node of the first node controller responsive to driving of the first driving circuit, wherein a level of a voltage of the Qb node of the first node controller is opposite to a level of a voltage of the Q node of the first node controller; and a first output circuit connected to the first node controller, the first output circuit configured to output a first scan signal to the first subpixel and a first carry signal and responsive to the voltage at the Q node and the voltage at the Qb node included in the first node controller, wherein the second stage comprises:

a second driving circuit configured to charge a M node of the second driving circuit based on the selection signal externally supplied to the second driving circuit responsive to the first carry signal received from the first stage, and charge a Q node of the second stage with the high voltage responsive to the reset signal and a voltage charged in the M node of the second driving circuit that corresponds to the selection signal;

a second node controller connected to the second driving circuit, the second node controller configured to control the Q node and a Qb node of the second node controller responsive to driving of the second driving circuit, wherein a level of a voltage of the Ob node of the second node controller is opposite to a level of a voltage of the Q node of the second node controller; and a second output circuit connected to the second node controller, the second output circuit configured to output a second scan signal to the second subpixel and a second carry signal responsive to the voltage at the Q node and the voltage at the Qb node included in the second node controller, wherein the first output circuit outputs the first scan signal to the first subpixel at a same time that the second output circuit outputs the second scan signal to the second subpixel.

8. The display device according to claim 7, wherein at least one of the first driving circuit and the second driving circuit comprises:

a first transistor, a second transistor, and a third transistor configured to charge the M node with the voltage corresponding to the selection signal responsive to the received carry signal, and a holding capacitor configured to store the selection signal as a voltage.

9. The display device according to claim 8, wherein:
the first transistor comprises a gate electrode connected to a carry signal output terminal of the other stage that outputs the carry signal received by the first driving circuit or the second driving circuit, a first electrode connected to a selection signal line that supplies the selection signal, and a second electrode,
the second transistor comprises a gate electrode connected to the carry signal output terminal of the other stage that outputs the carry signal received by the driving circuit, a first electrode connected to the second electrode of the first transistor, and a second electrode connected to the M node,
the third transistor comprises a gate electrode connected to the second electrode of the second transistor at the M node, a first electrode connected to a high voltage line that supplies the high voltage, and a second electrode connected to the second electrode of the first transistor and the first electrode of the second transistor, and
the holding capacitor comprises a first electrode and a second electrode, the first electrode connected to the high voltage line and the first electrode of the third transistor, and the second electrode connected to the gate electrode of the third transistor and the second electrode of the second transistor at the M node.

10. The display device according to claim 9, wherein at least one of the first driving circuit and the second driving circuit further comprises:
a fourth transistor comprising a gate electrode connected to the second electrode of the holding capacitor, the gate electrode of the third transistor, and the second electrode of the second transistor at the M node, a first electrode connected to the high voltage line, the first electrode of the holding capacitor, and the first electrode of the third transistor, and a second electrode, and
a fifth transistor having a gate electrode connected to a reset signal line that supplies the reset signal, a first electrode connected to the second electrode of the fourth transistor, and a second electrode connected to the Q node.

11. The display device according to claim 10, wherein at least one of the first driving circuit and the second driving circuit further comprises a sixth transistor comprising a gate electrode connected to a start signal line that supplies a start signal, a first electrode connected to the second electrode of the second transistor, the gate electrode of the third transistor, the second electrode of the holding capacitor, and the gate electrode of fourth transistor at the M node, and a second electrode connected to a low voltage line that supplies a low voltage that is less than the high voltage, the sixth transistor configured to discharge the M node responsive to the start signal.

12. The display device according to claim 7, wherein at least one of the first output circuit and the second output circuit comprises scan signal output terminals configured to simultaneously output scan signals generated as the on-voltage responsive to the voltage at the Q node.

13. A display device comprising:
a display panel comprising a plurality of touch electrodes and a plurality of subpixels including a first subpixel and a second subpixel, the plurality of touch electrodes configured to sense a touch of the display panel during a touch sensing period of a frame period, and the plurality of subpixels configured to display an image during a display driving period of the frame period; and
a gate driving circuit comprising a plurality of stages configured to output a plurality of scan signals to the plurality of subpixels, the plurality of stages including a first stage connected to the first subpixel and a second stage connected to the second subpixel,
wherein during the touch sensing period the first stage is configured to output a first scan signal from the plurality of scan signals to the first subpixel to sense touch of a first location of the display panel and the second stage is configured to output a second scan signal to the second subpixel at a same time that the first stage outputs the first scan signal to the first subpixel to sense touch of a second location of the display panel, and
wherein the first stage comprises:
a first driving circuit configured to charge a M node of the first driving circuit based on a selection signal externally supplied to the first driving circuit responsive to receiving a carry signal from another stage from the plurality of stages, and charge a Q node of the first stage with a high voltage responsive to a reset signal and a voltage charged in the M node of the first driving circuit that corresponds to the selection signal;
a first node controller connected to the first driving circuit, the first node controller configured to control the Q node and a Qb node of the first node controller responsive to driving of the first driving circuit, wherein a level of a voltage of the Qb node of the first node controller is opposite to a level of a voltage of the Q node of the first node controller; and
a first output circuit connected to the first node controller, the first output circuit configured to output the first scan signal to the first subpixel and a first carry signal and responsive to the voltage at the Q node and the voltage at the Qb node included in the first node controller,
wherein the second stage comprises:
a second driving circuit configured to charge a M node of the second driving circuit based on the selection signal externally supplied to the second driving circuit responsive to the first carry signal received from the first stage, and charge a Q node of the second stage with the high voltage responsive to the reset signal and a voltage charged in the M node of the second driving circuit that corresponds to the selection signal;
a second node controller connected to the second driving circuit, the second node controller configured to control the Q node and a Qb node of the second node controller responsive to driving of the second driving circuit, wherein a level of a voltage of the Qb node of the second node controller is opposite to a level of a voltage of the Q node of the second node controller; and
a second output circuit connected to the second node controller, the second output circuit configured to output the second scan signal to the second subpixel and a second carry signal responsive to the voltage at the Q node and the voltage at the Qb node included in the second node controller,
wherein the first output circuit outputs the first scan signal to the first subpixel at a same time that the second output circuit outputs the second scan signal to the second subpixel.

14. The display device of claim 13, wherein the first output circuit is configured to output a first plurality of scan signals that include the first scan signal during the touch sensing period, and the second output circuit is configured to output a second plurality of scan signals that include the second scan signal during the touch sensing period at a same time that the first output circuit outputs the first plurality of scan signals, wherein each of the first plurality of scan signals and each of the second plurality of scan signals are applied to a corresponding one subpixel from the plurality of subpixels to sense touch of the display panel.

15. The display device of claim 13, wherein the first driving circuit comprises:

a first transistor including a gate electrode connected to a carry signal output terminal of the other stage that outputs the carry signal received by the first driving circuit, a first electrode connected to a selection signal line that supplies the selection signal, and a second electrode, a second transistor including a gate electrode connected to the carry signal output terminal of the other stage that outputs the carry signal received by the first driving circuit, a first electrode connected to the second electrode of the first transistor of the first driving circuit, and a second electrode connected to the M node of the first driving circuit, a third transistor including a gate electrode connected to the second electrode of the second transistor at the M node of the first driving circuit, a first electrode connected to a voltage line that supplies the high voltage, and a second electrode connected to the second electrode of the first transistor and the first electrode of the second transistor, and a first holding capacitor including a first electrode and a second electrode, the first electrode connected to a high voltage line and the first electrode of the third transistor, and the second electrode connected to the gate electrode of the third transistor and the second electrode of the second transistor at the M node of the first driving circuit, wherein the second driving circuit comprises:

a first transistor including a gate electrode connected to a carry signal output terminal of the first stage that outputs the first carry signal received by the second driving circuit, a first electrode connected to the selection signal line that supplies the selection signal, and a second electrode, a second transistor including a gate electrode of connected to the carry signal output terminal of the first stage that outputs the carry signal received by the second driving circuit, a first electrode connected to the second electrode of the first transistor of the second driving circuit, and a second electrode connected to the M node of the second driving circuit, a third transistor including a gate electrode connected to the second electrode of the second transistor of the second driving circuit at the M node of the second driving circuit, a first electrode connected to the voltage line that supplies the high voltage, and a second electrode connected to the second electrode of the first transistor of the second driving circuit and the first electrode of the second transistor of the second driving circuit, and a second holding capacitor including a first electrode and a second electrode, the first electrode connected to the high voltage line and the first electrode of the third transistor of the second driving circuit, and the second electrode connected to the gate electrode of the third transistor of the second driving circuit and the second electrode of the second transistor of the second driving circuit at the M node of the second driving circuit.

16. The display device of claim 15, wherein the first driving circuit further comprises:

a fourth transistor comprising a gate electrode connected to the second electrode of the first holding capacitor, the gate electrode of the third transistor of the first driving circuit, and the second electrode of the second transistor of the first driving circuit at the M node of the first driving circuit, a first electrode connected to the high voltage line, the first electrode of the first holding capacitor, and the first electrode of the third transistor of the first driving circuit, and a second electrode of the fourth transistor of the first driving circuit, and a fifth transistor of the first driving circuit having a gate electrode connected to a reset signal line that supplies the reset signal, a first electrode connected to the second electrode of the fourth transistor of the first driving circuit, and a second electrode connected to the Q node of the first driving circuit, wherein the second driving circuit further comprises:

a fourth transistor of the second driving circuit comprising a gate electrode connected to the second electrode of the second holding capacitor, the gate electrode of the third transistor of the second driving circuit, and the second electrode of the second transistor of the second driving circuit at the M node of the second driving circuit, a first electrode connected to the high voltage line, the first electrode of the second holding capacitor, and the first electrode of the third transistor of the second driving circuit, and a second electrode, and a fifth transistor of the second driving circuit having a gate electrode connected to the reset signal line that supplies the reset signal, a first electrode connected to the second electrode of the fourth transistor of the second driving circuit, and a second electrode connected to the Q node of the second driving circuit.

17. The display device of claim 16, wherein the first driving circuit further comprises a sixth transistor of the first driving circuit comprising a gate electrode connected to a start signal line that supplies a start signal, a first electrode connected to the second electrode of the second transistor of the first driving circuit, the gate electrode of the third transistor of the first driving circuit, the second electrode of the first holding capacitor, and the gate electrode of fourth transistor of the first driving circuit at the M node of the first driving circuit, and a second electrode connected to a low voltage line that supplies a low voltage that is less than the high voltage, and the sixth transistor configured to discharge the M node of the first driving circuit responsive to the start signal, and wherein the second driving circuit further comprises a sixth transistor of the second driving circuit comprising a gate electrode connected to the start signal line that supplies the start signal, a first electrode connected to the second electrode of the second transistor of the second driving circuit, the gate electrode of the third transistor of the second driving circuit, the second electrode of the second holding capacitor, and the gate electrode of fourth transistor of the second driving circuit at the M node of the second driving circuit, and a second electrode connected to the low voltage line that supplies the low voltage, and the sixth transistor configured to discharge the M node of the second driving circuit responsive to the start signal.

18. The display device of claim 13, wherein during the display driving period the selection signal is supplied a number of times and a total number of stages from the plurality of stages that simultaneously output scan signals during the display driving period is based on the number of times the selection signal is supplied during the display driving period.

* * * * *